Patented Jan. 12, 1954

2,665,980

UNITED STATES PATENT OFFICE 2,665,980

PROCESS FOR GENERATION OF CARBON MONOXIDE

Charles R. Carkeek, Pasadena, Calif., assignor to The Texas Company, New York, N. Y., a corporation of Delaware No Drawing. Application May 5, 1950,
Serial No. 160,405

4 Claims. (Cl. 48—212)

This invention relates to a process for the generation of carbon monoxide and hydrogen from carbonaceous fuels, such as gaseous and liquid hydrocarbons, coal, coke, oil shale and the like. In one of its more specific aspects, this invention relates to an improved method for the production of carbon monoxide and hydrogen from a hydrocarbon oil with extraordinarily efficient utilization of the carbon values of the fuel.

Solid, liquid, or gaseous fuels may be used in the process of this invention. It is particularly applicable to the production of carbon monoxide and hydrogen from hydrocarbon oils.

Carbonaceous fuels other than those liquid hydrocarbons suitable for use as motor fuels may be converted to motor fuels by the Fischer-Tropsch type synthesis. By this process various carbonaceous fuels including natural gas, heavy oils, coal, coke, oil shale, and the like, may be converted to motor fuels, such as gasoline or diesel fuel. The carbonaceous fuel is first reacted with oxygen to produce a mixture of carbon monoxide and hydrogen as the synthesis feed gas which is, in turn, converted in the presence of a synthesis catalyst, usually iron or cobalt, to liquid hydrocarbons suitable for use in motor fuels.

The generation of carbon monoxide and hydrogen from carbonaceous fuel is also useful in various chemical processes. For example, carbon monoxide is desirable in the reduction of iron oxide to sponge iron. Hydrogen finds use in a number of chemical processes such as the synthesis of ammonia, hydrogenation processes, catalytic conversion of petroleum, etc.

Oxygen-enriched air, or commercially pure oxygen may be used in gas generation. Commercially pure oxygen is preferred for the generation of gases in those instances in which nitrogen is undesirable in the product. In generating gas for ammonia synthesis, oxygen-enriched air is often preferred. Steam is often desirable to control temperature in the reaction zone and to increase the production of hydrogen. The production of carbon monoxide and hydrogen may be carried out at temperatures above about 2000° F., preferably at 2200 to 2600° F. Higher temperatures may be used, the maximum being limited by available materials of construction.

It is desirable to carry out the oxidation of the fuel to carbon monoxide with concentrated oxygen, e. g., commercially pure oxygen, or enriched air, rather than with air, per se. In the generation of the carbon monoxide and hydrogen some difficulty is generally encountered with solid carbon in the product gas. Carbon may be produced in excessive quantities even when methane or natural gas is used as the fuel.

It is desirable to limit oxygen consumption to the practical minimum consistent with a satisfactory operating temperature. This often leads, however, to excessive carbon formation and excessive carbon contamination of the product gas, particularly in a reactor having a relatively large amount of surface compared to its volume or relatively high losses of radient heat energy. It is necessary to remove the carbon from the product gas prior to its utilization in chemical processes. Solid carbon contained in the product gas may be removed therefrom by various means, for example, by scrubbing the gas with oil or water, by filtration, cyclone separators, Cottrell precipitators, etc. It is often undesirable to contact the product gas with oil, since oil vapors are entrained in the gas and may adversely affect the reaction or catalyst in which the carbon monoxide, hydrogen, or mixture is utilized. Mechanical means effective to remove the carbon from the gas is expensive and more or less troublesome in operation. Water may be used effectively to remove carbon from the gas, but the suspension of carbon so recovered cannot generally be directly utilized in the process. The present invention provides a simple, effective and inexpensive method of removing carbon from the product gas, recovering the carbon, and utilizing it to generate additional carbon monoxide and hydrogen. Carbon values of the fuel which might otherwise be wasted are thereby utilized.

An object of this invention is to provide an improved process for the generation of carbon monoxide and hydrogen from solid, liquid, or gaseous carbonaceous fuels.

Another object is to provide a process for the separation of carbon produced as a by-product in the generation of carbon monoxide and hydrogen from carbonaceous fuel from the product gas and utilizing the carbon so recovered for the generation of additional gaseous product.

One of the more specific objects is to provide an improved process for the generation of carbon monoxide and hydrogen from a hydrocarbon oil.

In accordance with the process of this invention, carbon is removed from the product gas by intimately contacting the gas with water. The carbon is then transferred from the water to oil by intimately contacting water containing recovered carbon with oil. The oil and carbon mixture so obtained may be used directly for the generation of additional product gas.

This application relates to copending application of Charles R. Carkeek and Dale M. Strasser, Serial No. 99,908, filed June 18, 1949. In the said copending application, carbon is removed from the product gas by means of water and the recovered carbon is supplied to the gasification zone suspended in steam.

In some instances it may be desirable to use a wetting agent in the water as an aid in the recovery of the carbon from the product gas. The carbon contained in the product gas may be readily wetted and removed therefrom by means of water containing water-soluble oxygenated hydrocarbons resulting from the synthesis of liquid hydrocarbons by the interaction of carbon monoxide and hydrogen. The synthesis of liquid hydrocarbons results in the incidental formation of water and oxygenated hydrocarbons. These may be separated from the hydrocarbon product by condensation of the normally liquid products of the synthesis reaction. The normally liquid hydrocarbons, water, and oxygenated hydrocarbons separate into two immiscible liquid phases, namely, a hydrocarbon-rich phase and a water-rich phase. It has been found that the water-rich phase, that is, the water and water-soluble oxygenated hydrocarbons produced in the reaction, is particularly effective for the wetting of solid carbonaceous particles.

In a preferred embodiment of this invention a heavy hydrocarbon oil is reacted with oxygen in a gas generator comprising an unobstructed reaction zone free from solid packing and catalyst. Some steam is supplied to the generator to control the temperature and to produce hydrogen. The product gases are scrubbed with water preferably in a counter-current gas-liquid contact apparatus, e. g., a bubble tray column whereby particles of carbon contained in the product gas are transferred to the water. The water may be recirculated in the contacting apparatus. Various types of liquid-gas contact apparatus suitable for use in the process of this invention are known. A slurry of water containing recovered carbon is withdrawn from the gas scrubbing apparatus and intimately contacted with oil. The carbon is preferentially wet by oil and transferred to the oil forming a slurry of carbon in oil.

The water and carbon from the gas scrubbing operation may be subjected to a concentrating operation to increase the relative amount of carbon in the water prior to contacting it with oil. This may take place in a settling basin, thickener, filter, centrifugal separator, or the like. A number of forms of apparatus suitable for concentrating a slurry of carbon in water are known in the art.

The water and oil may be brought into intimate contact with one another in any of the various types of mixers. Alternatively, oil may be permitted to pass upwardly through a body of water, or drops of water may be permitted to pass downwardly through a body of oil. The oil and water may be separated from one another by decantation. The oil, containing carbon, so recovered, preferably forms at least a part of the feed to the gas generator, the carbon being converted therein to carbon monoxide and hydrogen. Part of the water may be fed to the gas generator with the oil and recovered carbon.

Where gas or solid carbonaceous fuel is used as the feed material, the oil containing recovered carbon may be fed in conjunction with the primary feed material in a combination burner or may be utilized in either a separate burner in the same gas generator, or in a separate gas generator. In any event, the process of the present invention provides a satisfactory means for recovering carbon from the carbon monoxide and hydrogen and utilizing the carbon for the production of additional carbon monoxide and hydrogen thus insuring substantially complete conversion of carbon in the fuel to carbon monoxide.

Obviously many modifications and variations of the invention, as hereinbefore set forth, may be made without departing from the spirit and scope thereof and, therefore, only such limitations should be imposed as are indicated in the appended claims.

I claim:

1. In a process for the production of carbon monoxide from carbonaceous fuels wherein said fuel is reacted with oxygen in a reaction zone to produce a product gas stream comprising carbon monoxide and containing entrained free carbon, the improvement which comprises intimately contacting said product gas stream in a gas scrubbing zone with water and thereby effecting removal of carbon from said gas stream and producing a dispersion of carbon in water, withdrawing said dispersion from said gas scrubbing zone, separating water from said dispersion to form an aqueous slurry, intimately contacting said aqueous slurry with a liquid hydrocarbon whereby carbon particles are transferred from said aqueous slurry to said liquid hydrocarbon to form a slurry of carbon particles in liquid hydrocarbon, and passing said liquid hydrocarbon containing carbon so recovered from the gas stream into said reaction zone for the conversion of said hydrocarbon and said recovered carbon to said product gas.

2. In a process for the production of carbon monoxide from carbonaceous fuels wherein said fuel is reacted with oxygen in a reaction zone to produce a product gas stream comprising carbon monoxide and containing entrained free carbon, the improvement which comprises intimately contacting said product gas stream in a gas scrubbing zone with water containing a wetting agent thereby effecting removal of carbon from said gas stream and producing a dispersion of carbon in water, withdrawing said dispersion from said gas scrubbing zone, separating water from said dispersion to form an aqueous slurry, intimately contacting said aqueous slurry with a liquid hydrocarbon whereby carbon particles are transferred from said aqueous slurry to said liquid hydrocarbon to form a slurry of carbon particles in said hydrocarbon and passing said liquid hydrocarbon containing carbon recovered from the gas stream into said reaction zone for the production of additional quantities of said product gas.

3. In a process for the production of carbon monoxide and hydrogen from a liquid hydrocarbon wherein said hydrocarbon is reacted with oxygen in a reaction zone to produce a product gas stream comprising carbon monoxide and hydrogen and containing entrained free carbon, the improvement which comprises intimately contacting said product gas stream with water in a gas scrubbing zone thereby effecting removal of free carbon from said gas stream and producing a dispersion of carbon in water, withdrawing said dispersion from said gas scrubbing zone, separating water from said dispersion to form a slurry of carbon in water, intimately contacting the slurry of carbon in water with at least a portion of said liquid hydrocarbon feed and thereby effecting a transfer of said carbon particles from the water to the hydrocarbon and forming a dispersion of solid carbon in liquid hydrocarbon, and passing said dispersion of carbon in liquid hydrocarbon to said reaction zone as at least a portion of the fuel feed to the reaction zone.

4. In a process for the production of carbon monoxide from carbonaceous fuels wherein said fuel is reacted with oxygen in a reaction zone to produce a product gas stream comprising carbon monoxide and containing entrained free carbon, the improvement which comprises intimately contacting said product gas stream with water in a gas scrubbing zone and thereby effecting removal of carbon from said gas stream and producing a dispersion of carbon in water, withdrawing said dispersion from said gas scrubbing zone, separating water from said dispersion to form an aqueous slurry, and intimately contacting said aqueous slurry with a liquid hydrocarbon whereby carbon particles are transferred from said aqueous slurry to said liquid hydrocarbon to form a slurry of carbon particles in liquid hydrocarbon.

CHARLES R. CARKEEK.

References Cited in the file of this patent

UNITED STATES PATENTS

| Number | Name | Date |
|---|---|---|
| 1,373,704 | Bates | Apr. 5, 1921 |
| 2,274,064 | Howard et al. | Feb. 24, 1942 |
| 2,431,455 | Blanding | Nov. 25, 1947 |
| 2,482,284 | Michael et al. | Sept. 20, 1949 |
| 2,527,846 | Phinney et al. | Oct. 31, 1950 |

FOREIGN PATENTS

| Number | Country | Date |
|---|---|---|
| 632,499 | France | Jan. 10, 1928 |